United States Patent
Hugon et al.

(10) Patent No.: US 9,889,603 B2
(45) Date of Patent: Feb. 13, 2018

(54) METHOD FOR LOCAL REINFORCEMENT OF A COMPOSITE FIBER REINFORCED PANEL AND PANEL OBTAINED USING SAID METHOD

(75) Inventors: Michael Hugon, La Chevroliere (FR); Alexandre Pelard, Amboise (FR); Dominique Soubelet, Nazelles (FR)

(73) Assignee: Daher Aerospace, Saint Julien de Chedon (FR)

( * ) Notice: Subject to any disclaimer, the term of this patent is extended or adjusted under 35 U.S.C. 154(b) by 648 days.

(21) Appl. No.: 14/130,057

(22) PCT Filed: Jul. 2, 2012

(86) PCT No.: PCT/EP2012/062861
§ 371 (c)(1),
(2), (4) Date: Jan. 30, 2014

(87) PCT Pub. No.: WO2013/004671
PCT Pub. Date: Jan. 10, 2013

(65) Prior Publication Data
US 2014/0134383 A1    May 15, 2014

(30) Foreign Application Priority Data
Jul. 1, 2011 (FR) ..................................... 11 55981

(51) Int. Cl.
*B29C 65/00* (2006.01)
*B29C 65/02* (2006.01)
(Continued)

(52) U.S. Cl.
CPC ............ *B29C 66/721* (2013.01); *B29C 65/02* (2013.01); *B29C 66/7392* (2013.01);
(Continued)

(58) Field of Classification Search
CPC ... B29C 65/02; B29C 66/721; B29C 66/7392; B29C 70/34; B29C 70/342;
(Continued)

(56) References Cited

U.S. PATENT DOCUMENTS 5,190,611 A * 3/1993 Cologna ............... B29C 73/063
156/94
5,242,523 A * 9/1993 Willden ................. B29C 70/44
156/245

(Continued)

FOREIGN PATENT DOCUMENTS

FR  2933067 A1   1/2010
WO 01/58680 A1   8/2001
(Continued)

*Primary Examiner* — Maria Veronica Ewald
*Assistant Examiner* — Travis Figg
(74) *Attorney, Agent, or Firm* — Im IP Law; C. Andrew Im

(57) ABSTRACT

A laminated composite structural panel with fiber reinforcement comprising a skin with a thickness $e_1$ and a localized reinforcement or patch. The skin is made up of a stack of fibrous plies in a matrix made of a thermoplastic polymer. The localized reinforcement or patch is joined to the surface of the skin and rises to a thickness of $e_2$ in a direction that is locally normal to the skin, which is made up of a stack of fibrous plies in a matrix made of thermoplastic polymer. The surface of the plies that make up the patch is decreasing from the ply of the patch in contact with the skin so that the edges of the patch have a slope p greater than 0.5. The patch and the skin is joined by a weld.

9 Claims, 2 Drawing Sheets

(51) Int. Cl.
  *B29C 70/34* (2006.01)
  *B29D 99/00* (2010.01)
  *B32B 5/26* (2006.01)
  *B32B 37/10* (2006.01)
  *B32B 38/00* (2006.01)
  *B64C 1/12* (2006.01)
  *B29L 31/30* (2006.01)

(52) U.S. Cl.
  CPC ............ *B29C 70/34* (2013.01); *B29C 70/342* (2013.01); *B29D 99/0014* (2013.01); *B32B 5/26* (2013.01); *B32B 37/1018* (2013.01); *B32B 38/0004* (2013.01); *B64C 1/12* (2013.01); *B29C 66/1122* (2013.01); *B29C 66/472* (2013.01); *B29C 66/71* (2013.01); *B29C 66/7212* (2013.01); *B29C 66/72141* (2013.01); *B29C 66/73921* (2013.01); *B29C 66/81455* (2013.01); *B29L 2031/3076* (2013.01); *Y02T 50/433* (2013.01)

(58) Field of Classification Search
  CPC ... B29C 66/1122; B29C 66/472; B29C 66/71; B29C 66/7212; B29C 66/72141; B29C 66/73921; B29D 99/0014; B32B 37/1018; B32B 38/0004; B32B 5/26; B64C 1/12
  See application file for complete search history.

(56) References Cited

U.S. PATENT DOCUMENTS 8,540,909 B2 *   9/2013   Dan-Jumbo ............ B29C 73/10
                                                    156/94

2003/0021958 A1 *   1/2003   Godbehere ............ B29C 70/30
                                                      428/189
2009/0317587 A1 *   12/2009   Deobald ............... B29C 70/865
                                                      428/119
2010/0012260 A1 *   1/2010   Brennan ................. B29C 70/30
                                                      156/196
2010/0080952 A1 *   4/2010   Suzuki .................... B29B 11/16
                                                      428/113
2010/0148394 A1 *   6/2010   Duqueine ............ B29C 66/721
                                                      264/241
2010/0170746 A1 *   7/2010   Restuccia ............ B29C 70/083
                                                      181/290
2010/0227105 A1 *   9/2010   Dan-Jumbo ............ B29C 73/10
                                                      428/63
2010/0227106 A1 *   9/2010   Dan-Jumbo ............ B29C 73/10
                                                      428/64.1
2010/0314029 A1 *   12/2010   Lindgren ................ B23Q 17/20
                                                      156/98
2010/0316458 A1 *   12/2010   Lindgren ................ B29C 73/10
                                                      409/79
2011/0132523 A1 *   6/2011   Evens ...................... B29C 73/10
                                                      156/94
2011/0217510 A1 *   9/2011   Harasse ................ B64C 1/1446
                                                      428/137
2014/0134383 A1 *   5/2014   Hugon .................... B29C 65/02
                                                      428/78

FOREIGN PATENT DOCUMENTS

WO        2008/139077 A2     11/2008
WO        2010/143212 A1     12/2010
WO   WO 2010143212 A1 *      12/2010  ............. B29C 70/34

* cited by examiner

METHOD FOR LOCAL REINFORCEMENT OF A COMPOSITE FIBER REINFORCED PANEL AND PANEL OBTAINED USING SAID METHOD

RELATED APPLICATIONS

This application is a § 371 application from PCT/EP2012/062861 filed Jul. 2, 1012, which claims priority from French Patent Application No. 11 55981 filed Jul. 1, 2011, each of which is herein incorporated by reference in its entirety.

TECHNICAL FIELD OF THE INVENTION

The invention relates to a method for the local reinforcement of a fiber reinforced composite panel and a panel obtained using said method. Its main but not exclusive application is in the aeronautics industry for making structural panels with areas requiring such local reinforcement, to address greater needs in terms of mechanical strength or rigidity.

BACKGROUND OF THE INVENTION

The optimization of working structures makes it necessary to adapt the local section of said structures to the intensity of the flow of forces through them. Thus, in the case of a metal structure, constituting particularly a fuselage panel, a rib or a longitudinal member in the structure of an aircraft, such adaptations are achieved by material removal, so as to create thicker and more rigid areas capable of transmitting higher force flows in the areas where greater rigidity and/or mechanical strength is required. At the location of cross section variations, geometric stress concentrations are created, which are related to the discontinuity in rigidity between the thicker and the thinner areas. These geometric discontinuities are thus the main locations for the initiation of fatigue cracks. This phenomenon is taken into account by a stress concentration coefficient or Kt, which coefficient increases as the distance over which the section varies is shorter.

If this same type of part is made of a laminated composite material, with a fiber reinforcement, said part is not obtained by material removal but by laying up fibrous layers or plies. If the local reinforcement of such a part by increasing its thickness remains desirable, it is achieved by the local addition of plies or patches extending over the area to reinforce. As with metal parts, the difference in rigidity between the running section and the reinforced section leads to the geometric concentration of stresses at the section variation location. Because composite materials have few mechanisms capable of accommodating the propagation of a crack, these coefficients may even have significantly higher values than with metal materials, with a given geometry. What is more, if a patch is made up of a stack of plies, there is a critical mode of degradation where the excess thickness corresponding to said patch is simply sheared at the interface of the patch with the remainder of the part. That phenomenon, also called 'peeling' is all the more likely when the said interface has defects such as porosities, or more generally bonding defects. Thus, in order to remedy these unwanted effects, patches are made by applying very gradual plies that lead to connecting slopes between the surface of the part and the excess thickness. These slopes generally range between 0.02 and 0.05. Thus, a thickness variation of 1 mm is applied over a distance ranging between 20 mm and 50 mm, so that the patch extends over a large surface and the reinforcement is not very localized in terms of geometry. Further, said patches are frequently covered with a ply extending between the skin and the top of said patch. Alternatively, if greater slopes are required, the adding of fastening elements such as rivets that go through the patch and the skin are known in the prior art. The document FR-2933067-A thus describes different solutions for the localized reinforcement of a panel made of laminated composite material. These solutions of the prior art, which allow the use of tape laying for making the panels, have drawbacks in terms of mass. Even though these solutions of the prior art have been developed initially for composite materials with a thermosetting matrix, these same solutions are reproduced for composite materials with a thermoplastic matrix, because the phenomena explained above are primarily attributable to the laminated nature of the material.

The document WO 01/58680 describes a structural panel comprising reinforcement patches, where both the panel and the patch are made of a composite with fiber reinforcement in a thermosetting resin.

OBJECT AND SUMMARY OF THE INVENTION

The invention is aimed at remedying the drawbacks of the prior art and to that end, it discloses a laminated composite structural panel with fiber reinforcement comprising:
  a. a skin with a thickness $e_1$, made up of a stack of fibrous plies in a matrix made of a thermoplastic polymer;
  b. a localized reinforcement or patch, joined to the surface of said skin and rising to a thickness of $e_2$ in a direction that is locally normal to the skin, made up of a stack of fibrous plies in a matrix made of thermoplastic polymer;
  c. the surface of the plies that make up said patch being decreasing from the ply of the patch in contact with the skin so that the edges of said patch have a slope greater than 0.5 and the joint between the patch and the skin is a weld.

Thus, surprisingly, such a patch, besides the geometric stress concentration, which is inevitable, is not or not very sensitive to the critical damage mode of peeling, and the charging of all the plies can be achieved with connecting slopes that are significantly higher than what can be achieved with patches using fibrous laminates with a thermosetting matrix. Without being bound by any theory, it is assumed that the thermoplastic constitution of the matrix makes it possible, firstly, to join the patch by welding, which join presents much less risk of the presence of bonding defects and secondly, the absence of reticulation allowing fracture strains that are far greater with thermoplastics than with thermosetting materials and the high fatigue strength of these polymers make it possible to explain the result at least in part.

Throughout this document, the term 'panel' designates a flat shell structure or a shaped structure with thickness below $\frac{1}{1000}^{ths}$ of the smallest of its surface dimensions. A localized reinforcement or patch extends over a surface that is less than or equal to a quarter of the surface of said panel.

The invention also relates to a method for making such a panel, which method comprises the steps of:
  a. making a patch by tape laying and consolidation of a stack of plies impregnated with a thermoplastic polymer;
  b. trimming the consolidated patch so as to achieve a slope above 0.5 at the edges of said patch;
  c. making a skin by tape laying fibrous plies pre-impregnated with a thermoplastic polymer;

d. placing the patch in contact with the skin at the required location;

e. raising the temperature of the patch and skin assembly to a temperature that is at least equal to the melting temperature of the thermoplastic polymer making up the matrix of the patch or the matrix of the skin so as to fix the patch to the skin;

f. jointly consolidating the patch and skin assembly.

According to an embodiment, the skin is brought into contact in the unconsolidated state with the patches, or can even be laid up on a tool in which one or more patches are already in place, or, alternatively, the skin may be pre-consolidated prior to its assembly with the patches. Regardless of the embodiment, the method according to the invention makes it possible to achieve perfect geometric correspondence between the patch and the skin even when said skin has a complex shape.

The invention can be implemented in the advantageous embodiments described below, which may be considered individually or in any technically operative combination.

In one embodiment, more particularly suited to aeronautics applications, the polymer that makes up the matrix of the skin and the polymer that makes up the matrix of the patch are selected from a group including polyetheretherketone (PEEK), polyphenylene sulphides (PPS), polyetherketoneketone (PEKK) and polyetherimide (PEI). These materials, which may be used for the implementation of the method according to the invention, have mechanical characteristics, particularly impact resistance, fire and smoke resistance capacities that are compatible with aeronautics applications.

In an advantageous embodiment, the panel according to the invention comprises patches on the two opposite sides of the skin. As said patches are added to the skin and not laid up with it, the panel with that characteristic may be consolidated jointly with said patches in a single operation and can thus be made according to a particularly productive method.

Advantageously, the method according to the invention includes, after step (d), a step of:

g. pulling a vacuum of the patch and skin assembly

Such evacuation makes it possible to bring about both the cohesion of the assembly during the joint consolidation cycle but also to apply the pressure required for the joint forming of the patch and the skin.

In one particular embodiment, the method according to the invention includes, between steps (c) and (d), a step of:

h. consolidating the skin.

This implementation method is particularly cost-effective and flexible, because it makes it possible, according to a first embodiment, to independently constitute the patches and skins and assemble them on demand. These two elements can be made advantageously from pre-consolidated plates that are easy to handle and have an indefinite storage life, so that the method can be integrated easily in a zero-inventory or just-in-time production process. Final joint consolidation makes the bond between patch and skin very strong.

Advantageously, the method according to the invention includes, between steps (e) and (f), a step of:

i. jointly forming the shapes of the patch and the skin.

This step is preferably applicable when the skin is put in contact with the patch when the skin is in the consolidated state. Such joint forming, which is allowed by the flexibility of the matrix of the patch and the skin raised to a sufficient temperature, allows perfect geometrical correspondence between the skin and the patch.

Advantageously, the embodiments of the method according to the invention may be combined to obtain a panel comprising reinforcing patches on the two opposite sides of the skin.

The invention also relates to a tooling for implementing the method according to the invention, characterized in that it comprises a caul plate that is adapted to apply pressure on the patch and the skin. Said caul plate makes it possible at the same time to apply even forming pressure on the assembly and also to size the thickness of the patch and skin assembly and thus obtain optimum defect-free compacting of the assembly, to guarantee the effective transfer of forces between the plies of the panel thus made when it is subjected to service stresses.

BRIEF DESCRIPTION OF THE DRAWINGS

The invention is described below in its preferred and non-limitative embodiments and by reference to FIGS. 1 to 5 wherein.

DETAILED DESCRIPTION OF THE EMBODIMENTS

Figure 1:
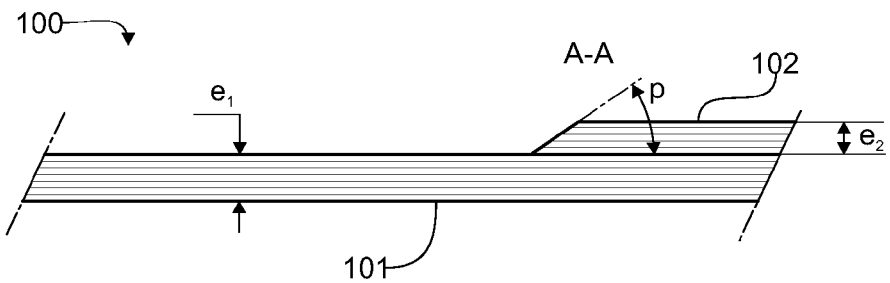
FIG. 1 is a partial sectional side view along a plane A-A defined in FIG. 2 of a laminated skin that is locally reinforced by a patch, also laminated according to an example of embodiment of the invention.

In FIG. 1, according to an exemplary embodiment of a panel (100) according to the invention, the panel comprises a laminated skin (101) with a thickness of $e_1$, locally reinforced by a patch (102) which is also stratified and has a thickness of $e_2$. According to the embodiment, $e_1 \leq e_2$ or $e_2 \leq e_1$. 'Laminated' means that both the skin (101) and the patch (102) are made up of a stack of plies comprising fibers, preferably but not exclusively continuous fibers, extending parallel to the sides of the skin, the direction of said fibers being defined within each ply. As a non-limitative example, said fibers are made of carbon, glass or aramid. The bonding of the plies is achieved by a matrix made of a thermoplastic polymer. According to a particular embodiment, the matrix of the skin (101) and the matrix of the patch (102) are made of the same thermoplastic polymer selected from a group including polyetheretherketone or PEEK, polyphenylene sulphide or PPS, polyetherketoneketone or PEKK and polyetherimide or PEI. However, the method according to the invention may be used for making composite pieces made of matrices and fibers offering lower performance, particularly for making the interior fittings of an aircraft.

The panel (100) is represented flat here for convenient representation; however, the invention applies mutatis mutandis to panels with a single or double curvature, constant or varying, where the curvature radius by order of magnitude is greater than 500 times the thickness. The panel according to the invention may also take more complex shapes, with falling edges or breaks, providing these changes in the surface are located outside the areas reinforced by the patch (102). The geometrical join between the side of the skin (101) and the top of the patch (102) is achieved by a slope p with a value typically ranging between 0.5 and 1.

Figure 2:
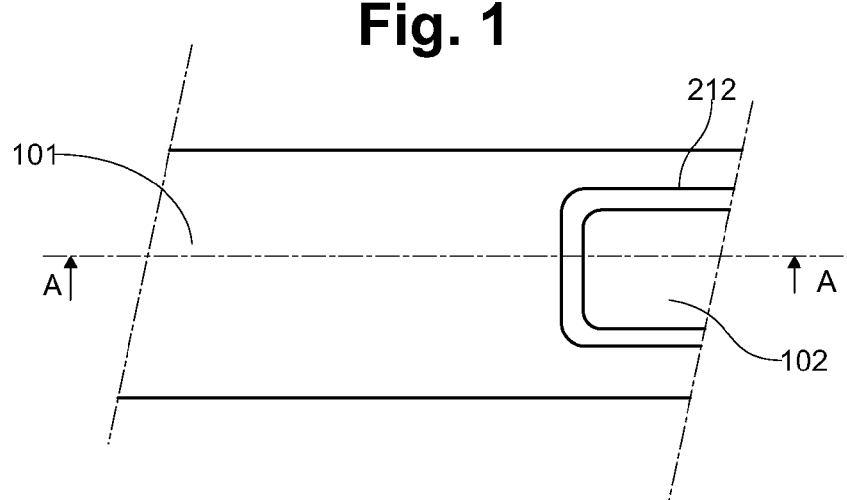
FIG. 2 is a partial top view of a panel made up of a skin and a reinforcing patch trimmed according to an example of embodiment of the invention.

In FIG. 2, the contour (212) of the patch (202) is made by trimming said patch in the consolidated state before it is added by welding or joint consolidation on the skin. Thus, complex contours can easily be made, while following the slope p. Such trimming is carried out by any means known to those skilled in the art, particularly a high-pressure abrasive water jet or a cutting tool.

In the totality of the document, joint consolidation is to be understood as a particular mode of welding, where the temperature of the assembly of the matrix making up the skin and the matrix making up the patch is raised to a temperature above or equal to their respective melting temperatures, then cooled jointly. That assembly mode is a preferred embodiment of the invention, but the assembly mode is not limitative and the patch and the skin may be assembled by other types of welding that only involve melting the matrix of the patch or the skin, which melting may be limited to a varying thickness on each side of the interface between the skin and the patch. Those skilled in the art will understand that the bonding of the patch with the skin will be stronger when the thickness that is melted and then welded is greater.

Figure 3:
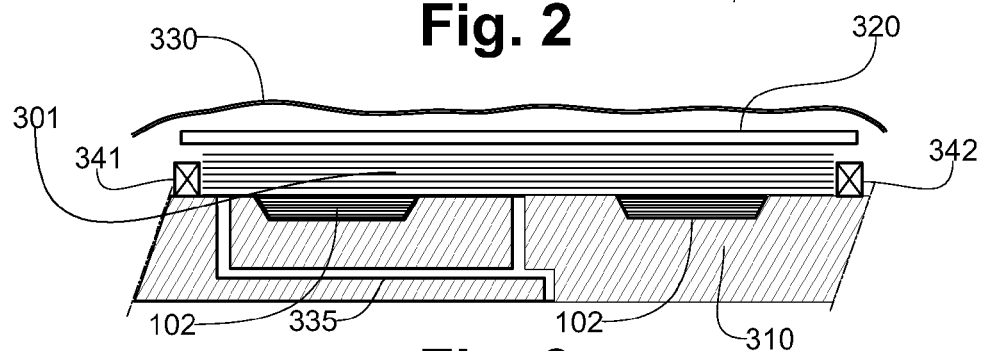
FIG. 3 is a partial sectional view of a tooling for implementing a method according to an exemplary embodiment of the invention that makes it possible to assemble pre-consolidated patches with a skin obtained by tape laying pre-impregnated plies on said patches placed in said tooling.

In FIG. 3, according to an example of a method for making a panel (100) according to the invention, the consolidated patches (102) are placed in the cavities of tooling (301). A stack (301) of pre-impregnated plies is placed on the tooling (310) in contact with the patches (102). A caul plate (320) is placed on the stack (301), and the volume located between the tooling (310) and the caul plate (320) is made airtight by means of a vacuum bag (330). The tool (310) comprises a circuit (315) for pulling a vacuum of that volume. According to alternative embodiments, the assembly may be placed in a stove or the tool may have an independent heating system that may use fluid circulation, electrical resistors or any heating method known to those skilled in the art. Thus, the application of negative pressure by the circuit (315) that applies a vacuum to the tooling (310) results in the compacting of the stack (301) of plies by the caul plate (320). Said caul plate (320) is stopped by sizing pieces (341, 342). The assembly is heated to a temperature at least equal to the melting temperature of the polymer that makes up the matrix of the skin (101) and the patch (102) while the vacuum is maintained. Applied by atmospheric pressure on the sizing pieces (341, 342), the caul plate (320) maintains the thickness of the skin at its theoretical value regardless of the swelling of said polymer when raised to its melting temperature. The assembly is then cooled under pressure, said pressure being maintained by the vacuum, at least until the assembly is solidified. Thus, the patches are perfectly integrated with the skin.

Figure 4:
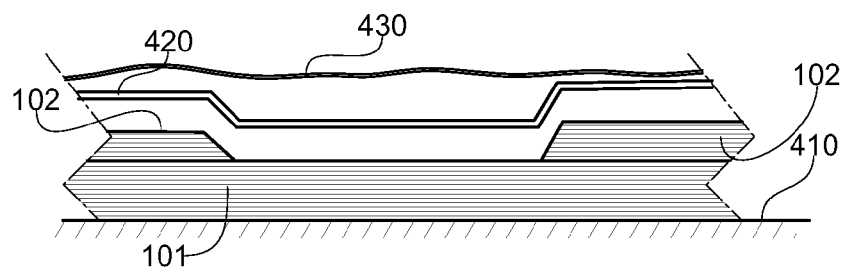
FIG. 4 is a sectional example of a tooling according to the embodiment of the invention integrating a caul plate adapted for application on the surface of a panel comprising reinforcing patches.

In FIG. 4, according to another example of implementation of the method according to the invention, the skin (101) is placed on the tooling (410) in the pre-consolidated state, as well as the patches (102) also placed in the pre-consolidated state, directly on the skin (101). A caul plate (420) reproducing the contour of the patches is placed on the assembly and as above (FIG. 3), the space between the tooling (410) and the caul plate (420) is sealed by a vacuum bagging (430). As above, the temperature of the assembly is raised to the melting temperature of the matrix of the skin (101) and the patches (102), under the pressure of the caul plate (420), which pressure is applied by the application of a vacuum to the space located between the tooling (410) and the vacuum bag (430). Thus, the patches (102) are integrated into the skin.

Those skilled in the art will easily understand that these two exemplary embodiments can be combined, particularly to obtain a panel comprising patches on each opposite side of the skin (101). The pressure applied to the patch and skin assembly by the caul plate (320, 420) also makes it possible to form the geometry of the assembly; that geometry is given by the geometry of the tooling (310, 410) and the geometry of the caul plate (320, 420).

Figure 5:
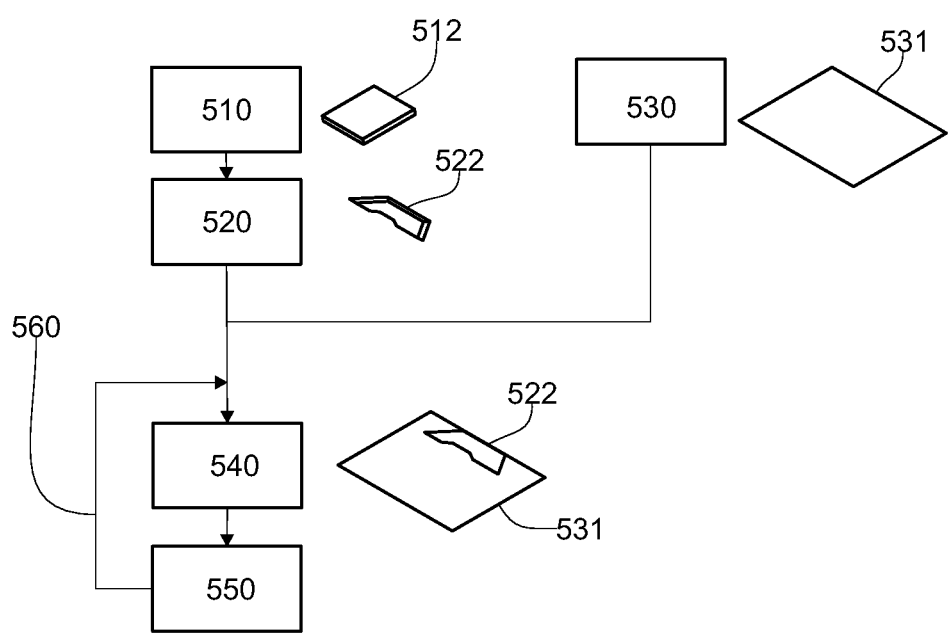
FIG. 5 is a chart of a method for making a locally reinforced panel according to an embodiment of the method of the invention.

In FIG. 5, according to an exemplary embodiment, the method according to the invention comprises steps that take place concurrently and not necessarily sequentially. Thus, a first step (510) consists in obtaining or making a consolidated laminated plate (512) or series of plates comprising fibrous reinforcement plies in a thermoplastic polymer matrix. These consolidated plates (512) are, during a trimming step (520), machined by any means known to those skilled in the art so as to give them their contour and bevel the edges of the contour in order to form a patch (522). In parallel, a skin (531) is made up in a tape laying step (530). That skin (531) is assembled with the patch (522) during a joint consolidation step (540). In a first embodiment, the step (530) of tape laying and consolidating the skin (531) is achieved before the step (540) of assembly and joint consolidation. The skin (531) is laid up on the consolidated patch (522), and the assembly is jointly consolidated so that said steps (530, 540) can take place sequentially or simultaneously. Optionally, a finishing step (550) consists in finishing the assembly, particularly by trimming the skin (531). In a particular embodiment, the patch and skin assembly thus finished may undergo a new joint consolidation cycle (560) with another patch, so as to create a reinforcement on the other side of the skin (531) for example.

The description above and the exemplary embodiments show that the invention achieves its objectives, particularly the making of a laminated composite panel comprising one or more areas reinforced by patches, using a particularly productive method.

The invention claimed is:

1. A laminated composite structural panel with fiber reinforcement comprising:
    a skin with a thickness $e_1$ that is smaller than $\frac{1}{1000}^{th}$ of its other surface dimensions, made up of a stack of fibrous plies in a matrix made of a thermoplastic polymer;
    a local reinforcing patch to locally increase a number of stacked up plies of the laminated composite structural panel, joined to a surface of the skin, extending over a surface that is less or equal to a quarter of the surface of the skin and rising to a thickness of $e_2$ in a direction that is locally normal to the skin, the local reinforcing patch made up of a stack of a plurality of fibrous plies in a matrix made of a thermoplastic polymer, wherein a whole surface of a first ply of the local reinforcing patch integrally contacts the surface of the skin; and
    wherein the surface of the stacked up plies that make up the local reinforcing patch is decreasing from the first ply of the local reinforcing patch in contact with the skin to a top of the local reinforcing patch so that edges of the local reinforcing patch have a slope p greater than 0.5, and the local reinforcing patch and the skin are joined by a weld extending through an interface between the first ply of the local reinforcing patch and the skin.

2. A panel according to claim 1, wherein the polymer that makes up the matrix of the skin and the polymer that makes up the matrix of the local reinforcing patch are selected from a group comprising polyetheretherketone, polyphenylene sulphides, polyetherketoneketone and polyetherimide.

3. A panel according to claim 1, wherein the skin comprises two sides and further comprising local reinforcing patches on the two sides of the skin.

4. A method for making a panel according to claim 1, comprising the steps of:
   making a patch preform by tape laying and consolidation of a stack of plies impregnated with the thermoplastic polymer to provide a consolidated preform;
   trimming said consolidated preform to make a contour having the slope above 0.5 at the edges of the patch;
   making the skin by tape laying fibrous plies pre-impregnated with the thermoplastic polymer;
   placing the patch in contact with the skin at a predetermined location;
   increasing a temperature of the patch and skin to at least equal to a melting temperature of the thermoplastic polymer making up the matrix of the patch or the matrix of the skin to fix the patch to the skin; and
   jointly consolidating the patch and skin assembly.

5. A method according to claim 4, comprising the step of pulling a vacuum of the patch and skin assembly after placing the patch in contact with the skin.

6. A method according to claim 5, comprising the step of consolidating the skin after making the skin by tape laying.

7. A method according to claim 6, comprising the step of jointly forming shapes of the patch and the skin.

8. A method for making a panel according to claim 7, wherein the panel comprises patches on the two opposite sides of the skin; comprising the steps of:
   making a first consolidated preform by integrating the patches on a first side of the skin; and
   integrating the patches on a side opposite the first side of the skin of the first consolidated preform.

9. Tooling for implementing a method according to claim 6, comprising a caul plate configured to apply pressure on the patch and the skin.

* * * * *